US007146365B2

(12) United States Patent
Allen et al.

(10) Patent No.: US 7,146,365 B2
(45) Date of Patent: Dec. 5, 2006

(54) METHOD, SYSTEM, AND PROGRAM FOR OPTIMIZING DATABASE QUERY EXECUTION

(75) Inventors: Terry Dennis Allen, San Jose, CA (US); Paramesh S. Desai, San Jose, CA (US); Akira Shibamiya, Los Altos, CA (US); Hong Sang Tie, San Jose, CA (US); Annie S. Tsang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 10/353,138

(22) Filed: Jan. 27, 2003

(65) Prior Publication Data

US 2004/0148273 A1 Jul. 29, 2004

(51) Int. Cl.
*G06F 17/30* (2006.01)

(52) U.S. Cl. ............................................. 707/8; 707/2
(58) Field of Classification Search .............. 707/1–10, 707/100–104.1
See application file for complete search history.

(56) References Cited

U.S. PATENT DOCUMENTS

| 5,093,911 | A | 3/1992 | Parks et al. ............ 707/104.1 |
| 5,307,484 | A | 4/1994 | Baker et al. ................ 707/102 |
| 5,515,531 | A | 5/1996 | Fujiwara et al. ................ 707/3 |
| 5,551,027 | A | 8/1996 | Choy et al. .................. 707/201 |
| 5,692,174 | A | 11/1997 | Bireley et al. ................. 707/3 |
| 5,813,005 | A | 9/1998 | Tsuchida et al. ............... 707/10 |
| 5,918,224 | A | 6/1999 | Bredenberg .................. 707/102 |
| 5,960,194 | A | 9/1999 | Choy et al. .................. 707/102 |
| 6,101,495 | A | 8/2000 | Tsuchida et al. ............... 707/4 |
| 6,192,359 | B1 | 2/2001 | Tsuchida et al. ............... 707/4 |
| 6,266,660 | B1 | 7/2001 | Liu et al. ........................ 707/3 |
| 6,353,820 | B1 * | 3/2002 | Edwards et al. ............... 707/2 |
| 6,470,331 | B1 * | 10/2002 | Chen et al. .................... 707/2 |
| 6,598,041 | B1 | 7/2003 | Bernal et al. |
| 6,609,131 | B1 * | 8/2003 | Zait et al. .................... 707/102 |
| 6,772,163 | B1 * | 8/2004 | Sinclair et al. ............. 707/100 |

OTHER PUBLICATIONS

Leslie, Harry, et al. *Efficient Search of Multidimensional B-Trees.* Proceedings of the 21st International Conference on Very Large Data Bases, pp. 710-719. Zurich, Switzerland Sep. 11-15, 1995.
U.S. Appl. No. 10/440,333, filed on May 16, 2003, entitled *Method, System and Program for Managing Database Operations with Respect to a Database Table*, by R.M. Croisettier et al.

(Continued)

*Primary Examiner*—Jeffrey Gaffin
*Assistant Examiner*—Yicun Wu
(74) *Attorney, Agent, or Firm*—Janaki K. Davda; Konrad Raynes & Victor LLP

(57) ABSTRACT

Disclosed is a method, system, and program for database query execution. A range of data pages is assigned to each of multiple parallel tasks. For each of the multiple parallel tasks, the range of data pages is mapped to one or more physical partitions, and a data partitioned secondary index partition associated with each of the one or more physical partitions is identified. Each of the multiple parallel tasks is executed to process the database query against the assigned range of data pages using the one or more data partitioned secondary index partitions.

21 Claims, 6 Drawing Sheets

OTHER PUBLICATIONS

Miller, Roger L. "DB2® for z/OS Technology Highlights," IBM Silicon Valley Lab, DB2 for z/OS [online] [retrieved on Aug. 30, 2002].

"Partitioned Tables and Indexes." Oracle9i Database Concepts, Release I (9.0.1), Part No. A88856-02, 1996-2001 [online] [retrieved on Aug. 30, 2002]. Retrieved from http:download-west.oracle.com.

* cited by examiner

METHOD, SYSTEM, AND PROGRAM FOR OPTIMIZING DATABASE QUERY EXECUTION

BACKGROUND OF THE INVENTION

1. Field of the Invention

The present invention is related generally to optimizing database query execution and, in particular, to optimizing database query execution using query parallelism and a data partitioned secondary index.

2. Description of the Related Art

In a relational data model, a table has rows made up of columns of data, and the table is created within a tablespace. If the tablespace is partitioned, the table is partitioned across the partitions of the tablespace. A tablespace may be stored in one or more physical partitions on one or more storage devices, and a single table partition is stored on a single physical partition. A physical partition is a fixed size division of storage. Statement (1) is an example of a SQL statement that may be used to create a tablespace named "TS1" with three partitions (represented by "NUMPARTS 3" in the SQL statement), referred to as partition 1, partition 2, and partition 3 for this example.

CREATE TABLESPACE TS1 NUMPARTS 3; (1)

Statement (2) is an example of a SQL statement that may be used to create a table named "Q1" with at least four columns, DATE, CUSTOMER_NUMBER, STATE, AND PURCHASE_AMOUNT. The ellipses in statement (2) indicate that additional columns may be included. Table "Q1" is created in tablespace "TS1", with a partitioning key on the DATE column. The partitioning key on the DATE column indicates that dates up to and including '2002-01-31' are in partition 1, dates greater than '2002-01-31' up to and including '2002-02-28' are in partition 2, and dates greater than '2002-02-28' up to and including '2002-03-31' are in partition 3. In other words, partition 1 is for January 2002, partition 2 is for February 2002, and partition 3 is for March 2002. In particular, if a DATE column value falls in January 2002 for a row, then that row is stored in partition 1 of the tablespace. If a DATE column value falls in February 2002 for a row, then that row is stored in partition 2 of the tablespace. If a DATE column value falls in March 2002 for a row, then that row is stored in partition three of the tablespace.

```
CREATE TABLE Q1 (DATE, ...,                    (2)
                 CUSTOMER_NUMBER, ...,
                 STATE, ...,
                 PURCHASE_AMOUNT...,)
    IN TS1
    PARTITIONING KEY (DATE)
        (PART 1 VALUES ('2002-01-31'),
         PART 2 VALUES ('2002-02-28'),
         PART 3 VALUES ('2002-03-31'));
```

A partitioning index is used to direct the placement of records into physical partitions based on index key values. An index key is a set of one or more columns in a table used to determine the order of index entries. Typically, one partitioning index is associated with one tablespace, which may be stored across multiple physical partitions. Statement (3) is an example of a SQL statement that may be used to create a partitioning index on table "Q1" with a key on the DATE column.

CREATE INDEX DATE_IX ON Q1 (DATE) PARTITIONED CLUSTER; (3)

A database query may be submitted against one or more tables. The database query includes one or more predicates for selection of data. A predicate is an element of a search condition that expresses or implies a comparison operation. For example, for a table storing employee data and named "emp", the predicate (emp.lastname="Smith") is used to determine whether a last name stored in an employee table matches "Smith". Additionally, an index may be used to access data. An index is set of pointers that are logically ordered by the values of a key. Indexes provide quick access to data and can enforce uniqueness on the rows in the table. An index has an index key. For example, for the "emp" table, an index may have a key of last name. If a predicate in the database query references a column of a table that is also a key column of an index, the index may be used to access the data associated with rows of data having the requested column value.

One type of index is a data partitioned secondary index (DPSI), which is a physically partitioned secondary index. That is, the data partitioned secondary index is itself partitioned. Each data partitioned secondary index partition is associated with a physical partition of a partitioned table. The data partitioned secondary index is created on one or more columns of a table. Unlike a partitioning index, a given key value may occur in multiple partitions of the data partitioned secondary index. Statement (4) is an example of a SQL statement that may be used to create a data partitioned secondary index on table "Q1" with a key on the STATE column.

CREATE INDEX STATE_IX ON Q1 (STATE) PARTITIONED; (4)

Statement (5) is an example of a SQL query against table "Q1" in which a predicate (WHERE DATE BETWEEN '2002-01-01' AND '2002-02-28' AND STATE='CA') references a key of the partitioning index (via reference to DATE) and references a key of the data partitioning secondary index (via reference to STATE).

```
SELECT CUSTOMER_NUMBER, PURCHASE_AMOUNT      (5)
FROM Q1
WHERE DATE BETWEEN '2002-01-01' AND '2002-02-28' AND
      STATE = 'CA'
ORDER BY CUSTOMER_NUMBER;
```

One relational data model is a Relational DataBase Management System (RDBMS) using a Structured Query Language (SQL) interface. In certain RDBMSs, query parallelism may be enabled when the RDBMS is set up. Query parallelism refers to the use of parallel tasks to execute a database query. Query parallelism is accomplished by triggering multiple concurrent execution requests within a single database query. The term "execution requests" refers to both input/output ("I/O") requests and central processing unit ("CPU") processing requests.

Existing techniques for index access query parallelism involve key range partitioning. That is, the index includes one or more key columns whose values identify one or more rows. For example, for a table storing employee data, there may be a last name column. Then, the index for the table may include a last name key column. The index may be partitioned according to key ranges. For example, one key range may include values for the last name key column that start with A–M, while a second key range may include values for the last name key column that start with N–Z. Thus, "key range partitioning" refers to assigning different key ranges of an index to different parallel tasks. Each of the parallel tasks then executes the query for its assigned key range of the index, and the results of the parallel tasks are combined to form a single result from execution of the database query.

The techniques for index access query parallelism involving key range partitioning have disadvantages when extended to data partitioned secondary index access. With a data partitioned secondary index with a key of last name, last names beginning with any letter (i.e., A–Z) may be found in any or all physical partitions. Using the A–M and N–Z key range partitioning, each parallel task may need to search all of the data partitioned secondary index partitions, leading to possible I/O contention at the index level. That is, if multiple parallel tasks try to access the same data partitioned secondary index partition, contention may arise in the event that an I/O subsystem that manages access to the data partitioned secondary index partition cannot satisfy all requests to access the data partitioned secondary index partition concurrently. Additionally, there may be I/O contention at the data page level due to multiple parallel tasks attempting to access the same data page concurrently. This leads to increased elapsed time (i.e., the time from the start of execution of a database query to the time results of the database query are returned).

Therefore, there is a need in the art for improved database query execution.

SUMMARY OF THE INVENTION

Provided are a method, system, and program for database query execution. A range of data pages is assigned to each of multiple parallel tasks. For each of the multiple parallel tasks, the range of data pages is mapped to one or more physical partitions, and a data partitioned secondary index partition associated with each of the one or more physical partitions is identified. Each of the multiple parallel tasks is executed to process the database query against the assigned range of data pages using the one or more data partitioned secondary index partitions.

The described implementations of the invention provide a method, system, and program for optimizing database queries involving data partitioned secondary index access by utilizing query parallelism.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1A:
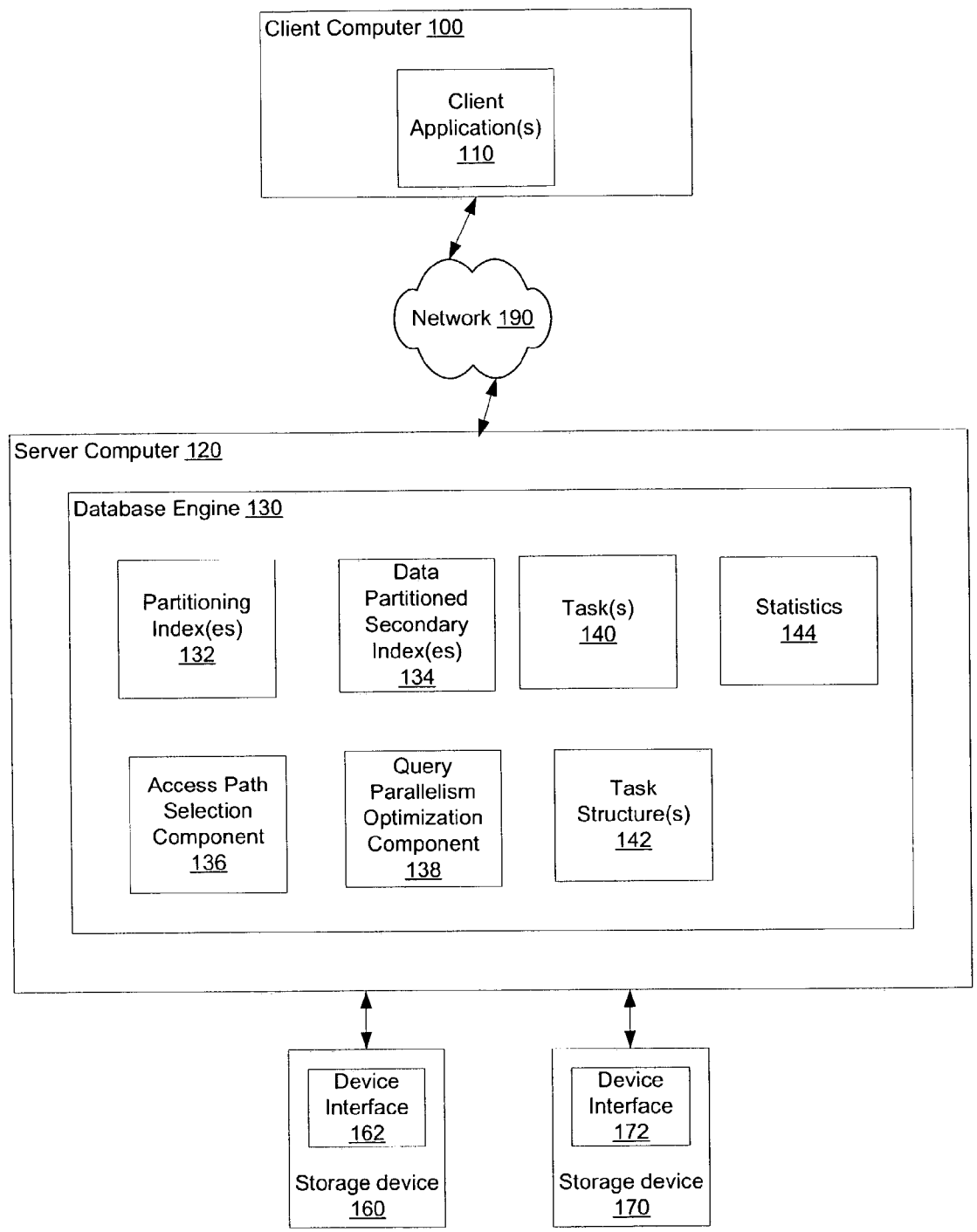
FIG. 1A illustrates, in a block diagram, a computing environment in accordance with certain implementations of the invention.

FIG. 1A illustrates, in a block diagram, a computing environment in accordance with certain implementations of the invention. A client computer 100 executes one or more client applications 110. A client application 110 may be any type of application program. The client computer 100 is connected to a server computer 120 by a network 190, such as a local area network (LAN), wide area network (WAN), or the Internet. The Internet is a world-wide collection of connected computer networks (i.e., a network of networks).

The server computer 120 includes a database engine 130. The database engine maintains one or more partitioning indexes 132 and one or more data partitioned secondary indexes 134. Also, the database engine 130 includes an access path selection component 136 for selecting an access path. An access path specifies how data referenced in a database query is to be accessed in a physical partition (e.g., whether an index is to be used to access the data). Moreover, the database engine 130 includes a query parallelism optimization component 138 that determines a number of parallel tasks 140 and a range of data pages to be assigned to each parallel task 140 for executing the database query in parallel.

Furthermore, the server 120 is connected to storage devices 160, 170, and each storage device 160, 170 has a device interface 162, 172, respectively. For example, each storage device 160 and 170 may be a redundant array of independent disks (RAID). A RAID device enables storage of the same data on multiple hard disks, thus allowing simultaneous accesses to copies of the data.

A client application 110 may submit database queries to the database engine 130. In certain implementations, the database engine 130 is a Relational DataBase Management System (RDBMS) using a Structured Query Language (SQL) interface, and the client application 110 submits SQL queries. The SQL interface has evolved into a standard language for RDBMS software and has been adopted as such by both the American National Standards Institute (ANSI) and the International Standards Organization (ISO). A DB2® for z/OS product available from International Business Machines, Corporation is an example of an RDBMS. The database engine 130 processes the database query against database objects (e.g., rows of tables). Each database object may be accessed via the partitioning index 132 and one or more data partitioned secondary indexes 134.

In implementations of the invention, when the access path selection component 136 of the database engine 130 has chosen an access path utilizing index access through a data partitioned secondary index 134, the query parallelism optimization component 138 separates execution of the database query into multiple parallel tasks 140, such that each parallel task 140 processes a same key range, but a discrete data page range associated with a partitioned table qualified by the database query.

Statistics 144 on the physical partitions may be used to estimate the elapsed time for each parallel task 140 and to determine the data page ranges to assign to each parallel task 140 so that elapsed time is equally distributed across the parallel tasks 140. A task structure 142 (e.g., an array) is associated with a query and includes an entry for each parallel task 140. Each entry of the task structure 142 stores a low data page identifier (e.g., an address of a data page) and a high data page identifier (e.g., an address of a data page) identifying a data page range assigned to a parallel task 140. In certain implementations, each entry of the task structure 142 also stores a low key and a high key identifying a key range assigned to a parallel task 140. Additionally, in certain implementations, the key range assigned to each parallel task 140 is the same.

Figure 1B:
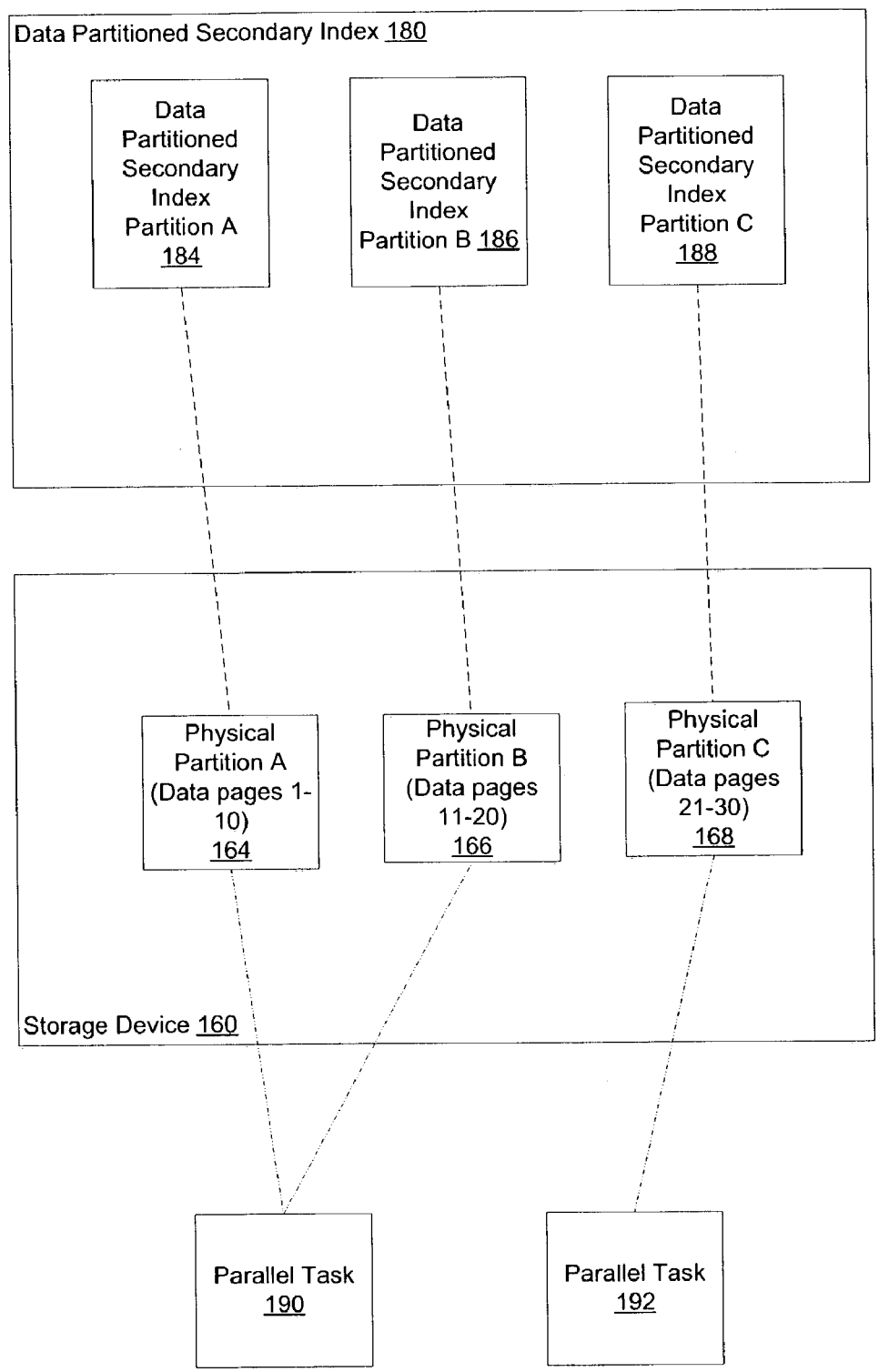
FIG. 1B illustrates, in a block diagram, mapping of a data partitioned secondary index to physical partitions on a storage device against which parallel tasks execute in accordance with certain implementations of the invention.

FIG. 1B illustrates, in a block diagram, mapping of a data partitioned secondary index 180 to physical partitions on storage device 160 against which parallel tasks 190, 192 execute in accordance with certain implementations of the invention. In particular, the data partitioned secondary index 180 is partitioned into three partitions: data partitioned secondary index partition A 184, data partitioned secondary index partition B 186, and data partitioned secondary index partition C 188. Storage device 160 stores physical partition A 164 with data pages 1–10, physical partition B 166 with data pages 11–20, and physical partition C 168 with data pages 21–30. Each data partitioned secondary index partition is associated with a physical partition. For example, data partitioned secondary index partition A 184 is associated with physical partition A 164. Data partitioned secondary index partition B 186 is associated with physical partition B 166. Data partitioned secondary index partition C 188 is associated with physical partition C 168. Additionally, parallel task 190 is assigned data pages 1–10 of physical partition A 164 and data pages 11–20 of physical partition B 166. Parallel task 192 is assigned data pages 21–30 of physical partition C 168.

Thus, by assigning data pages to parallel tasks, implementations of the invention are able to map the data pages to physical partitions, which are then mapped to associations with data partitioned secondary index partitions. Since different parallel tasks access different data pages and different data partitioned secondary index partitions, I/O contention between parallel tasks is minimized and overall elapsed time is reduced. Thus, implementations of the invention achieve an elapsed time improvement over sequential database query execution by creating multiple parallel tasks to concurrently access data through a data partitioned secondary index and by using data page range partitioning (i.e., assigning different data page ranges to different parallel tasks having the same key range).

Figure 2A:
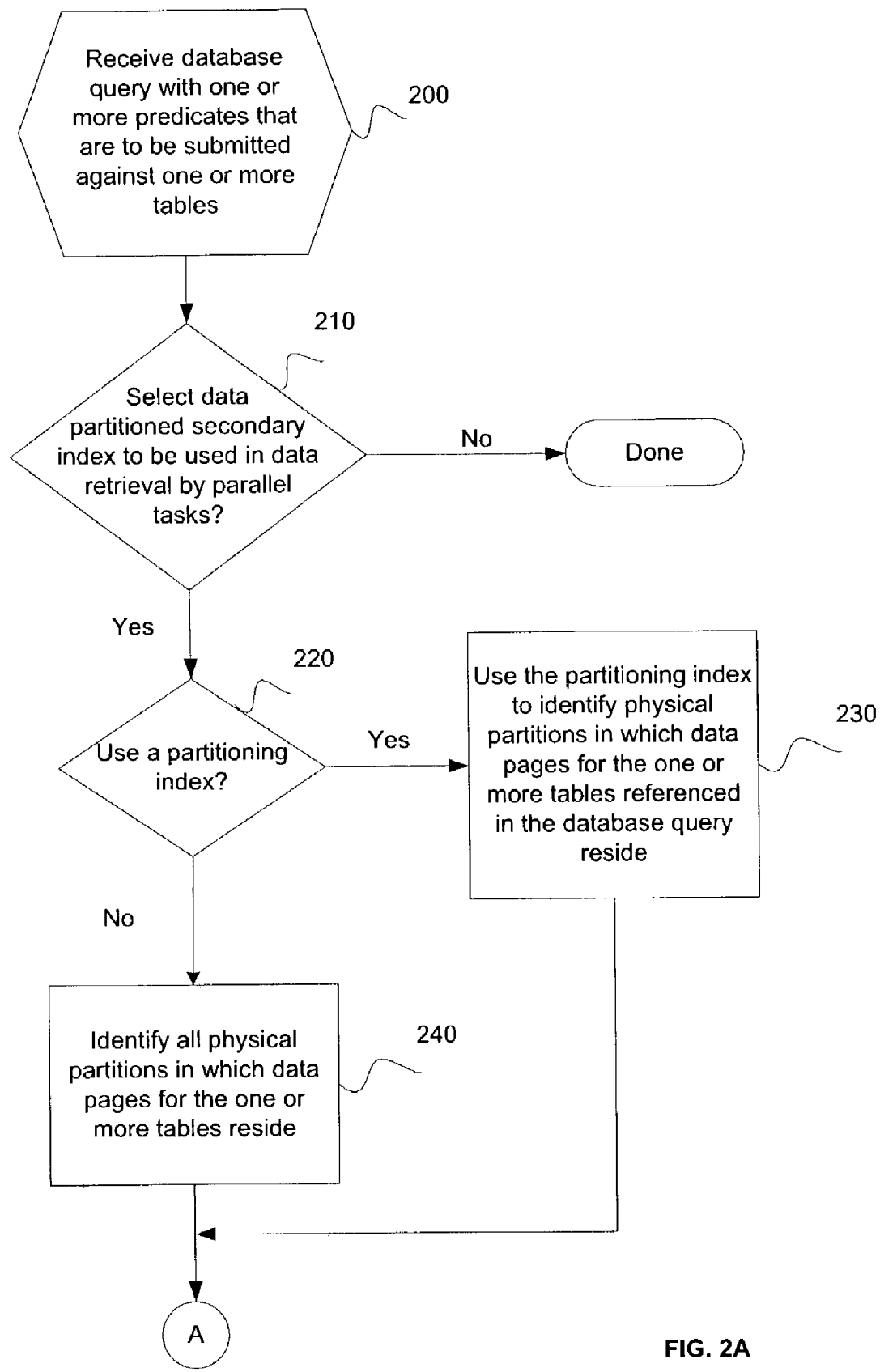
FIGS. 2A and 2B illustrate logic for initial processing of a database query in accordance with certain implementations of the invention.
Figure 2B:
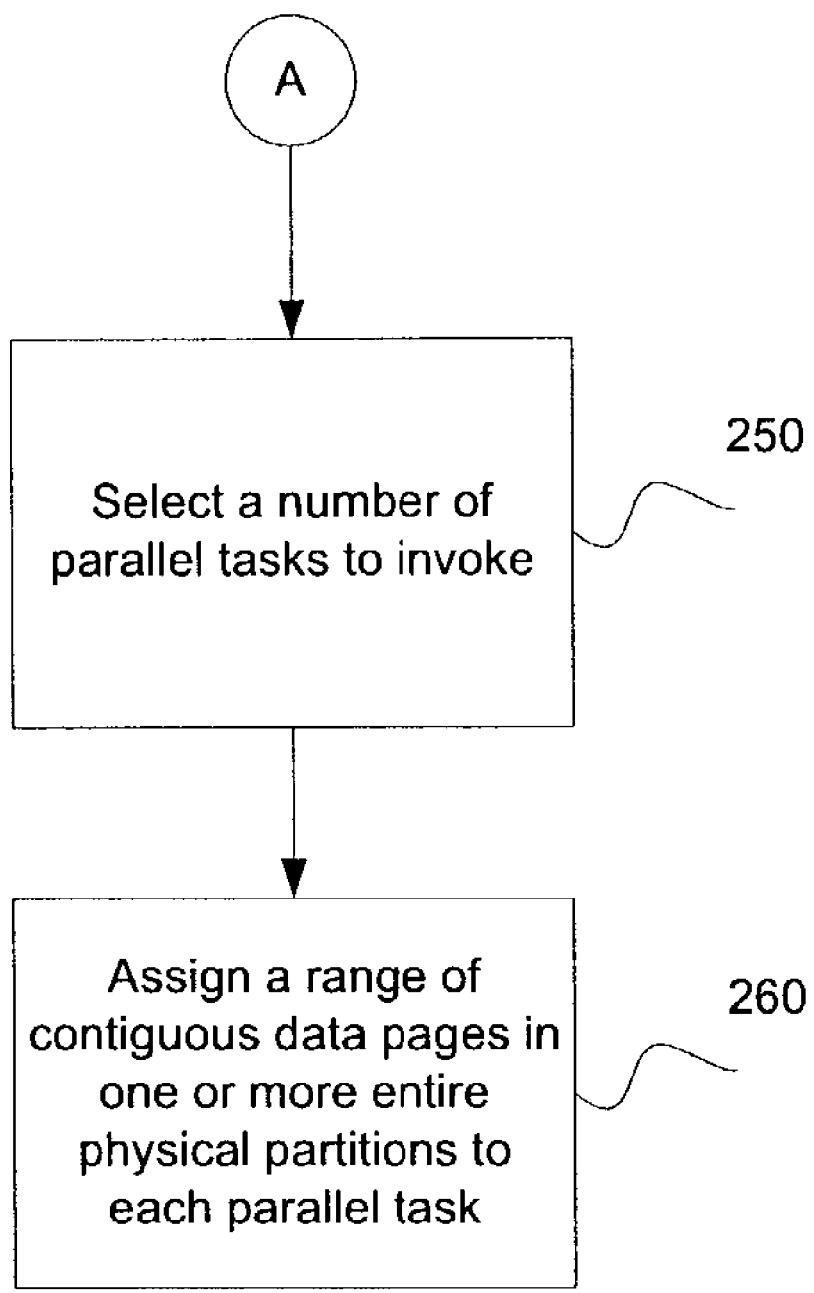

FIGS. 2A and 2B illustrate logic for initial processing of a database query in accordance with certain implementations of the invention. Control begins at block 200 with the database engine 130 receiving a database query with one or more predicates that are to be submitted against one or more tables. In a database engine 130 in which query parallelism is enabled, the database query may be processed with multiple tasks being executed in parallel.

In block 210, if the access path selection component 136 of the database engine 130 has selected an access path utilizing index access through a data partitioned secondary index 134 to be used in data retrieval by parallel tasks, processing continues to block 220, otherwise the processing of implementations of the invention is done and other processing occurs to execute the database query.

In block 220, the database engine 130 determines whether a partitioning index may be used to identify physical partitions. In particular, the database engine 130 determines whether any predicates reference index keys in a partitioning index associated with the tablespaces in which the one or more tables referenced in the database query reside. Improved performance is realized by predicates on a partitioning index, as this serves to reduce the range of qualified partitions. If a partitioning index may be used, processing continues to block 230, otherwise, processing continues to block 240. In block 230, the database engine 130 uses the partitioning index to identify physical partitions in which data pages for the one or more tables referenced in the database query reside. In block 240, the database engine 130 identifies all physical partitions in which data pages for the one or more tables referenced in the database query reside.

In certain implementations, the query parallelism optimization component 138 of the database engine 130 separates execution of the database query into multiple parallel tasks. In block 250, the query parallelism optimization component 138 selects a number of parallel tasks to invoke. In certain implementations, the number of parallel tasks is selected by a user or an application. In certain implementations, the number of parallel tasks maybe limited by the server computer 120 or database engine 130. In certain implementations, the number of parallel tasks depends on the number and speed of available processors at the server computer 120 and/or the number of physical partitions to be accessed in processing the database query. In certain implementations, however, the number of parallel tasks does not exceed the number of processors or the number of physical partitions. Also, if execution of the database query is dominated by processor cost, then the number of parallel tasks is more closely related to the number of processors and the speed of the processors. If execution of the database query is dominated by I/O cost, then the number of parallel tasks is more closely related to the number of physical partitions.

In block 260, the query parallelism optimization component 138 assigns a range of contiguous data pages in one or more entire physical partitions to each parallel task. In certain implementations, an entry of a task structure 142 stores a low data page identifier and a high data page identifier identifying a data page range assigned to a parallel task. In certain implementations, statistics 144 on the physical partitions may be used to estimate the elapsed time for each parallel task and to determine the data page ranges to assign to each parallel task so that elapsed time is equally distributed across the parallel tasks. For example, some statistics that may be used include the size of a table and the number of rows in each partition of that table. In certain implementations, each parallel task is assigned a same number of data pages. In certain implementations, one or more of the parallel tasks may be assigned a different number of data pages than one or more other parallel tasks. In certain implementations, the number of data pages assigned to each parallel task depends on the number of pages in each physical partition. Each parallel task has the same key range determined by the predicates in the database query, but accesses different data pages in the physical partitions. Also, the data pages assigned to a parallel task are within one or more entire physical partitions. That is, multiple parallel tasks do not access data pages in the same physical partition, thus avoiding contention at the data page level.

Figure 3:
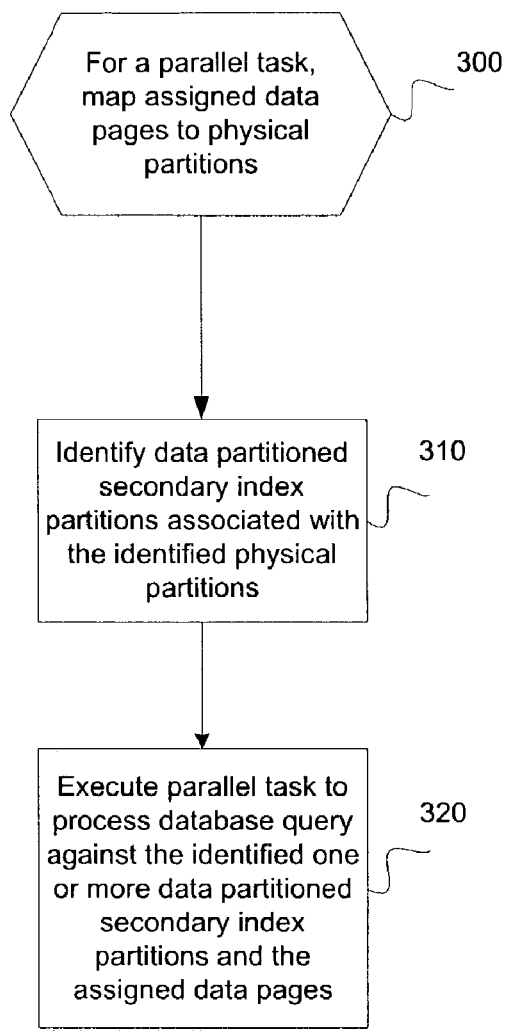
FIG. 3 illustrates logic for processing performed to enable execution of parallel task in accordance with certain implementations of the invention.

FIG. 3 illustrates logic for processing performed to enable execution of a parallel task in accordance with certain implementations of the invention. Control begins at block 300 with the database engine 130 mapping the assigned data pages to one or more physical partitions. In block 310, the database engine 130 identifies one or more data partitioned secondary index partitions associated with the one or more physical partitions. In block 320, the database engine 130 executes the parallel task to process the database query against the one or more data partitioned secondary index partitions and the assigned data pages. Since the assigned data pages fall into one or more entire physical partitions, and each physical partition is associated with a data partitioned secondary index, contention at the index level is avoided. Additionally, although FIG. 3 illustrates processing for one parallel task, the processing of FIG. 3 is performed for each parallel task.

In summary, implementations of the invention reduce the overall elapsed time associated with database query execution by utilizing parallel execution, while minimizing I/O contention and I/O wait time. In certain implementations, the partitioning strategy assigns disparate data page ranges to different parallel task, each with the same key range, thereby minimizing contention at the data page level and reducing overall elapsed time beyond an approach that partitions based on the index key.

IBM, DB2, and z/OS are registered trademarks or trademarks of International Business Machines Corporation in the United States and/or other countries.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD ROMs, optical disks, etc.), volatile and non volatile memory devices (e.g., EEPROMs, ROMs, PROMs, RAMs, DRAMs, SRAMs, firmware, programmable logic, etc.). Code in the computer readable medium is accessed and executed by a processor. The code in which described embodiments are implemented may further be accessible through a transmission medium or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A, 2B, and 3 describe specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The illustrated logic of FIGS. 2A, 2B, and 3 was described as being implemented in software. The logic may be implemented in hardware or in programmable and non-programmable gate array logic.

Figure 4:
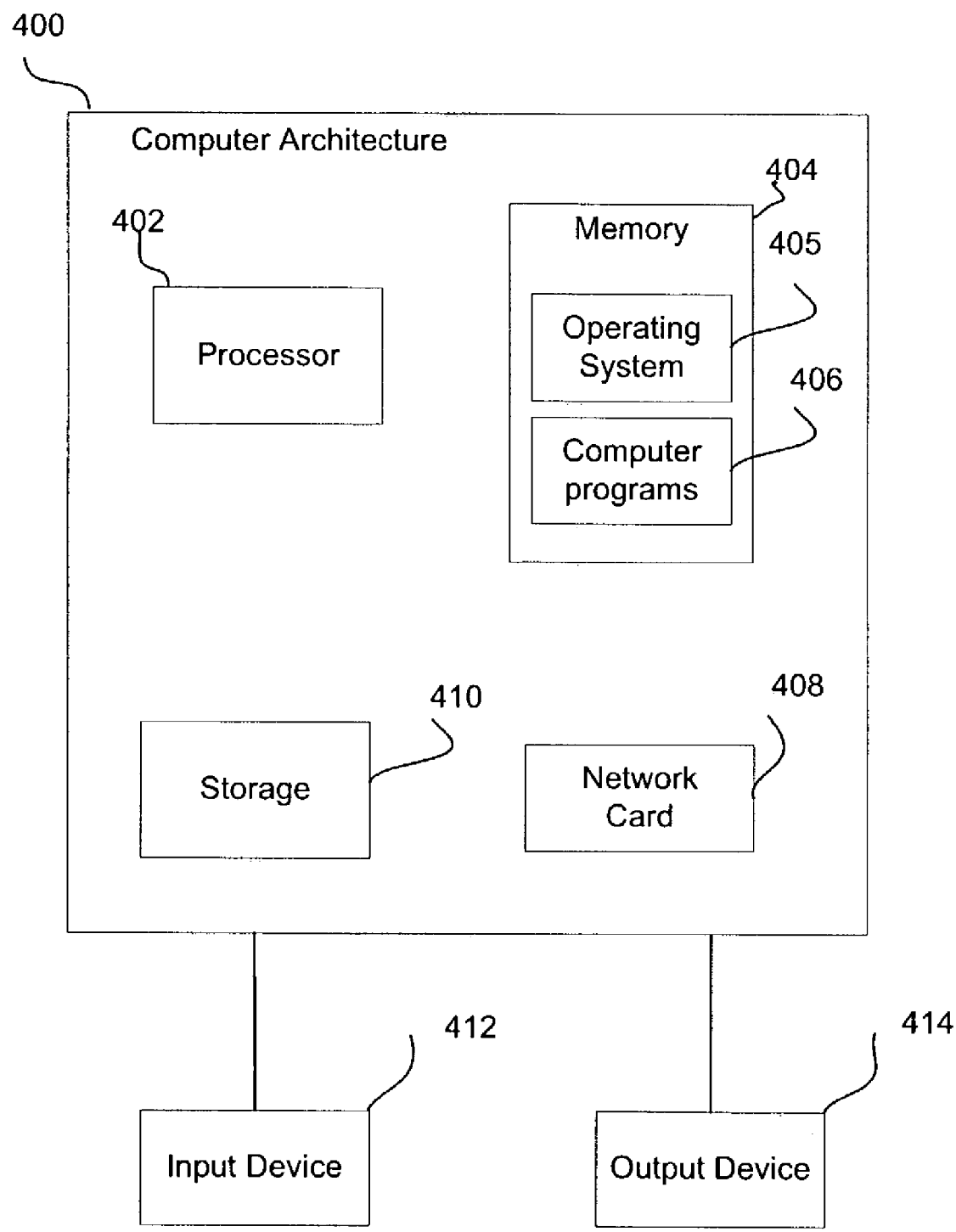
FIG. 4 illustrates one implementation of the architecture of the computer systems of FIG. 1A in accordance with certain implementations of the invention.

FIG. 4 illustrates one implementation of the architecture of the computer systems 100, 120 in accordance with certain implementations of the invention. The computer systems 100, 120 may implement a computer architecture 400 having a processor 402 (e.g., a microprocessor), a memory 404 (e.g., a volatile memory device), a network card 408, and storage 410 (e.g., a non-volatile storage area, such as magnetic disk drives, optical disk drives, a tape drive, non-volatile RAM, etc.). An operating system 405 may execute in memory 404. The storage 410 may comprise an internal storage device or an attached or network accessible storage. Computer programs in the storage 410 may be loaded into the memory 404 and executed by the processor 402 in a manner known in the art. A network card 408 enables communication with a network. An input device 412 is used to provide user input to the processor 402, and may include a keyboard, mouse, pen-stylus, microphone, touch sensitive display screen, or any other activation or input mechanism known in the art. An output device 414 is capable of rendering information transmitted from the processor 402, or other component, such as a display monitor, printer, storage, etc.

The computer architecture 400 may comprise any computing device known in the art, such as a mainframe, server, personal computer, workstation, laptop, handheld computer, telephony device, network appliance, virtualization device, storage controller, etc. Any processor 402 and operating system 405 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for database query execution, comprising:
    assigning a different range of data pages to each of multiple parallel tasks;
    for each of the multiple parallel tasks,
        mapping the assigned different range of data pages to one or more physical partitions; and
        identifying one or more data partitioned secondary index partitions associated with each of the one or more physical partitions, wherein each of the one or more data partitioned secondary index partitions is a partition of a physically partitioned secondary index; and
    executing each of the multiple parallel tasks to process the database query against the assigned different range of data pages using the one or more data partitioned secondary index partitions.

2. The method of claim 1, wherein one data partitioned secondary index partition is associated with one physical partition.

3. The method of claim 1, further comprising:
determining whether an access path using a data partitioned secondary index is to be used.

4. The method of claim 1, further comprising:
determining whether a partitioning index is to be used; and
if the partitioning index is to be used, using the partitioning index to identify the one or more physical partitions in which data pages for one or more tables referenced in the database query reside.

5. The method of claim 1, further comprising:
selecting a number of the multiple parallel tasks to be executed.

6. The method of claim 1, wherein each range of data pages comprises a range of contiguous data pages for an entire physical partition.

7. The method of claim 1, further comprising:
using a task structure associated with the database query, wherein each entry of the task structure stores a range of data pages assigned to one of the multiple parallel tasks.

8. A system for database query execution, comprising:
means for assigning a different range of data pages to each of multiple parallel tasks;
for each of the multiple parallel tasks,
means for mapping the assigned different range of data pages to one or more physical partitions; and
means for identifying one or more data partitioned secondary index partitions associated wit each of the one or more physical partitions, wherein each of the one or more data partitioned secondary index partitions is a partition of a physically partitioned secondary index; and
means for executing each of the multiple parallel tasks to process the database query against the assigned different range of data pages using the one or more data partitioned secondary index partitions.

9. The system of claim 8, wherein one data partitioned secondary index partition is associated with one physical partition.

10. The system of claim 8, further comprising:
means for determining whether an access path using a data partitioned secondary index is to be used.

11. The system of claim 8, further comprising:
means for determining whether a partitioning index is to be used; and
means for, if the partitioning index is to be used, using the partitioning index to identity the one or more physical partitions in which data pages for one or more tables referenced in the database query reside.

12. The system of claim 8, further comprising;
means for selecting a number of the multiple parallel tasks to be executed.

13. The system of claim 8, wherein each range of data pages comprises a range of contiguous data pages for an entire physical partition.

14. The system of claim 8, further comprising:
means for using a task structure associated with the database query, wherein each entry of the task structure stores a range of data pages assigned to one of the multiple parallel tasks.

15. An article of manufacture including instructions for database query execution, wherein the instructions cause operations to be performed, the operations comprising:
assigning a different range of data pages to each of multiple parallel tasks;
for each of the multiple parallel tasks,
mapping the assigned different range of data pages to one or more physical partitions; and
identifying one or more data partitioned secondary index partitions associated with each of the one or more physical partitions, wherein each of the one or more data partitioned secondary index partitions is a partition of a physically partitioned secondary index; and
executing each of the multiple parallel tasks to process the database query against the assigned different range of data pages using the one or more data partitioned secondary index partitions.

16. The article of manufacture of claim 15, wherein one data partitioned secondary index partition is associated with one physical partition.

17. The article of manufacture of claim 15, wherein the operations further comprise:
determining whether an access path using a data partitioned secondary index is to be used.

18. The article of manufacture of claim 15, wherein the operations further comprise:
determining whether a partitioning index is to be used; and
if the partitioning index is to be used, using the partitioning index to identify the one or more physical partitions in which data pages for one or more tables referenced in the database query reside.

19. The article of manufacture of claim 15, wherein the operations further comprise:
selecting a number of the multiple parallel tasks to be executed.

20. The article of manufacture of claim 15, wherein each range of data pages comprises a range of contiguous data pages for an entire physical partition.

21. The article of manufacture of claim 15, wherein the operations further comprise:
using a task structure associated with the database query, wherein each entry of the task structure stores a range of data pages assigned to one of the multiple parallel tasks.

* * * * *